United States Patent [19]
Ledebur

[11] 3,945,547
[45] Mar. 23, 1976

[54] TRACTIVE APPARATUS
[75] Inventor: Harry C. Ledebur, Canfield, Ohio
[73] Assignee: Wean United Inc., Pittsburgh, Pa.
[22] Filed: Apr. 26, 1974
[21] Appl. No.: 464,542

Related U.S. Application Data
[63] Continuation of Ser. No. 25,418, April 3, 1970.

[52] U.S. Cl. ............... 226/172; 198/179; 226/173; 226/188
[51] Int. Cl............................................. B65h 17/24
[58] Field of Search............ 226/108, 168, 171–173, 226/188; 198/110, 179, 180, 210; 308/200

[56] References Cited
UNITED STATES PATENTS

| | | | |
|---|---|---|---|
| 1,321,463 | 11/1919 | Lloyd................................. | 226/171 |
| 2,789,683 | 4/1957 | Stahl.................................. | 198/110 |

Primary Examiner—Richard A. Schacher
Attorney, Agent, or Firm—Michael Williams

[57] ABSTRACT

Tractive apparatus for longitudinally moving elongated material providing opposed tractive assemblies for gripping material therebetween by opposed and balanced gripping forces. Each tractive assembly provides a plurality of tractive members in end-to-end relation confined to circulation in a closed path and the apparatus is characterized by the provision of means for holding the tractive members in abutting relationship at least during the time they grip the material.

The apparatus is further characterized by the reduction of frictional forces on the tractive members by forcing the latter against the elongated material by sets of rolling bodies, each set of which circulates in a closed path within a respective tractive member path. Each tractive member has a material gripping face and each face is maintained in assembled relation with its tractive member by magnetic attraction to provide for ready removal and replacement of such faces.

20 Claims, 13 Drawing Figures

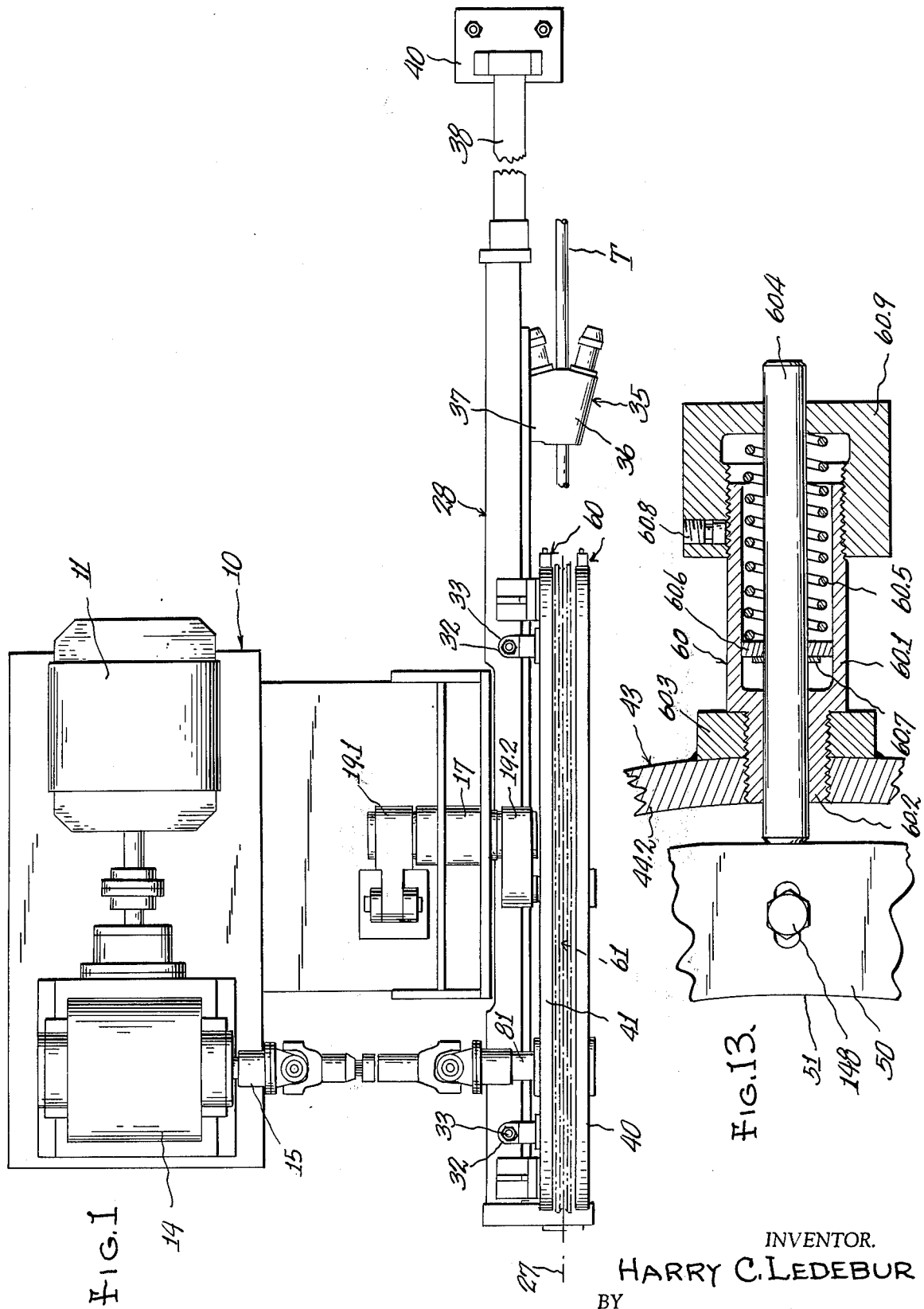

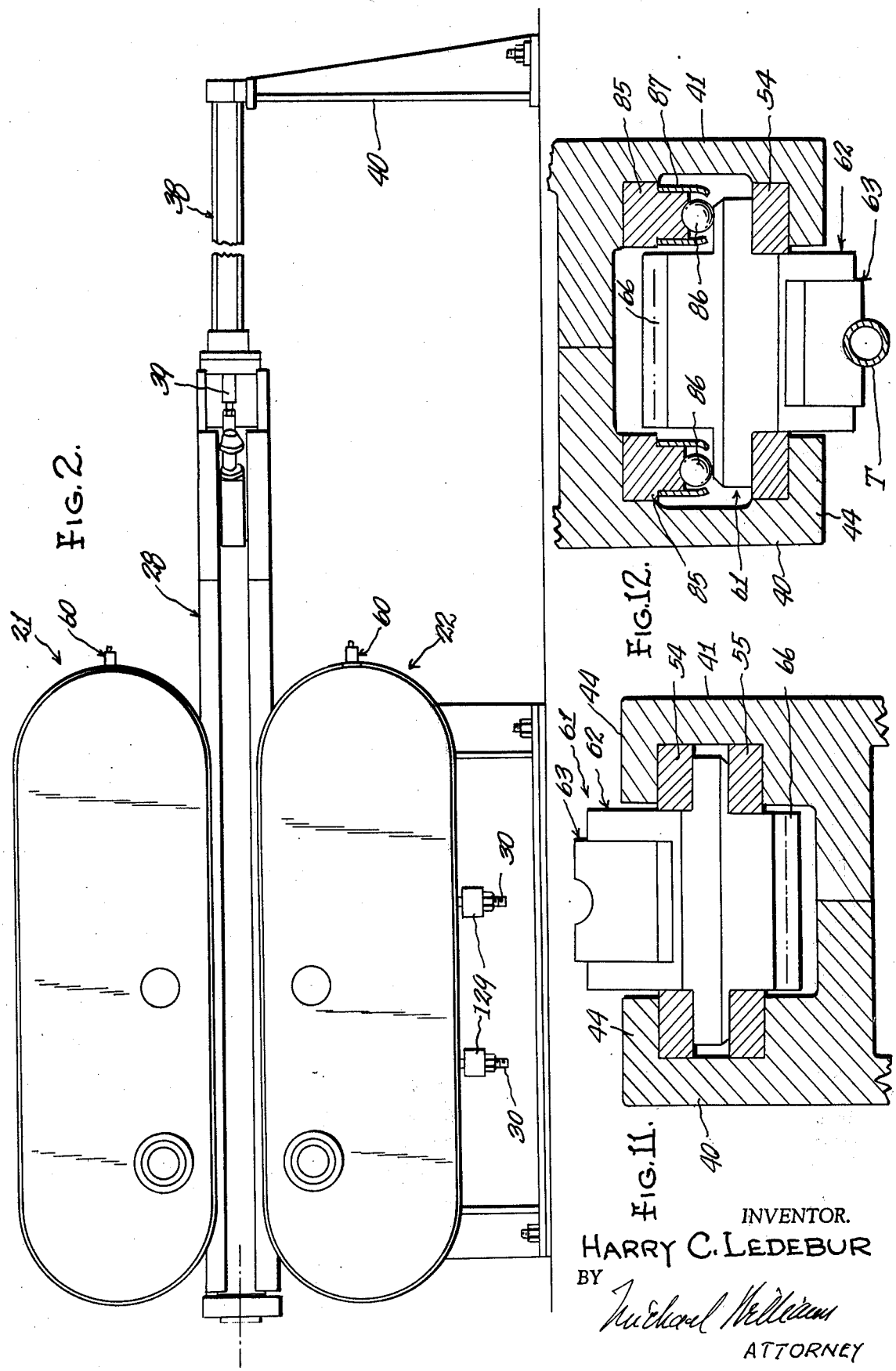

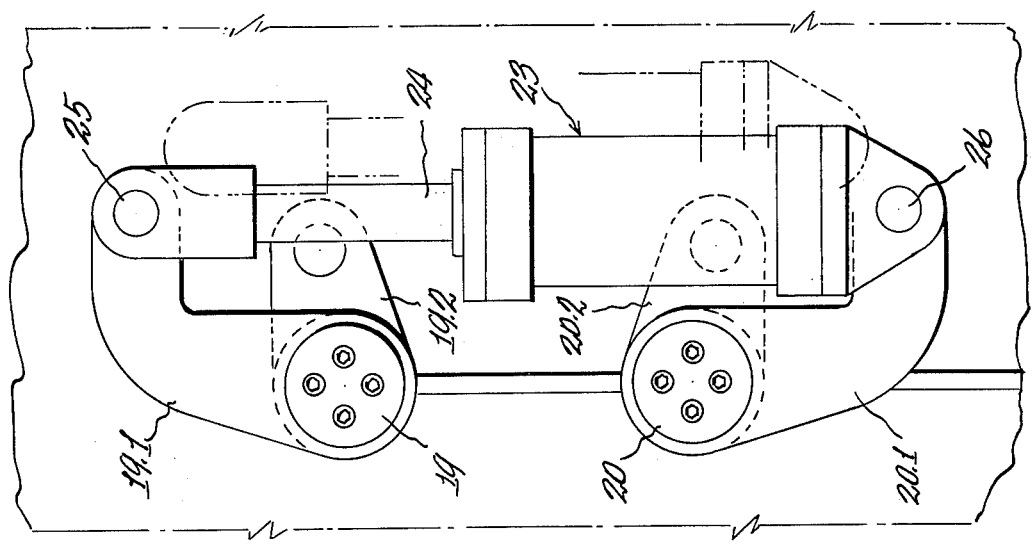
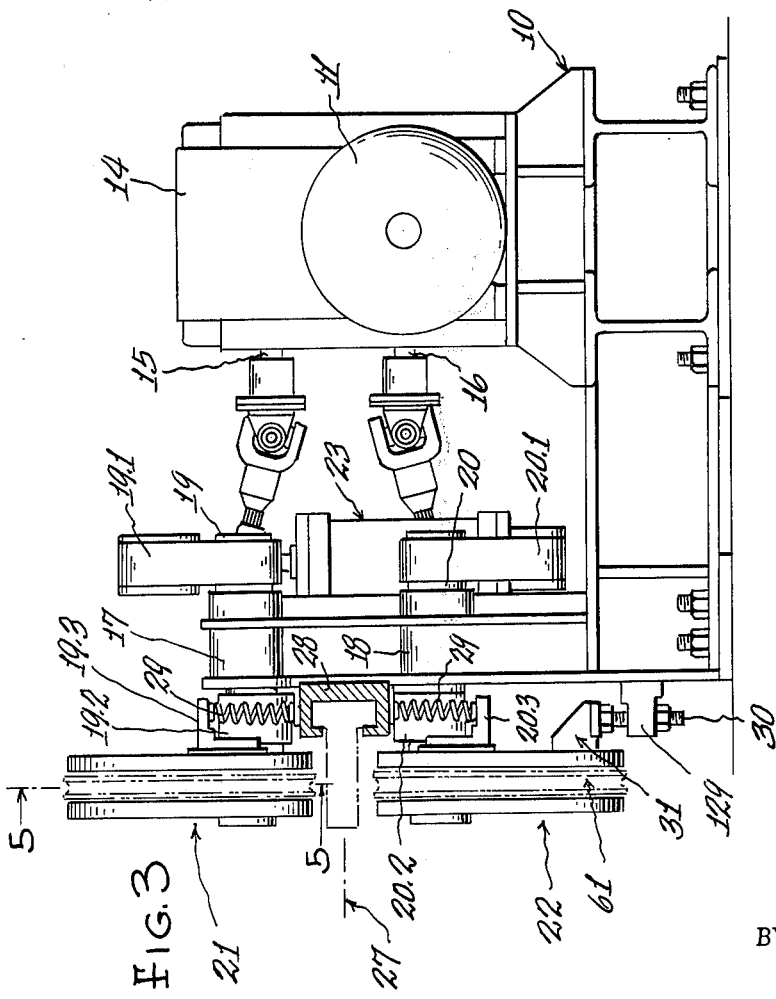

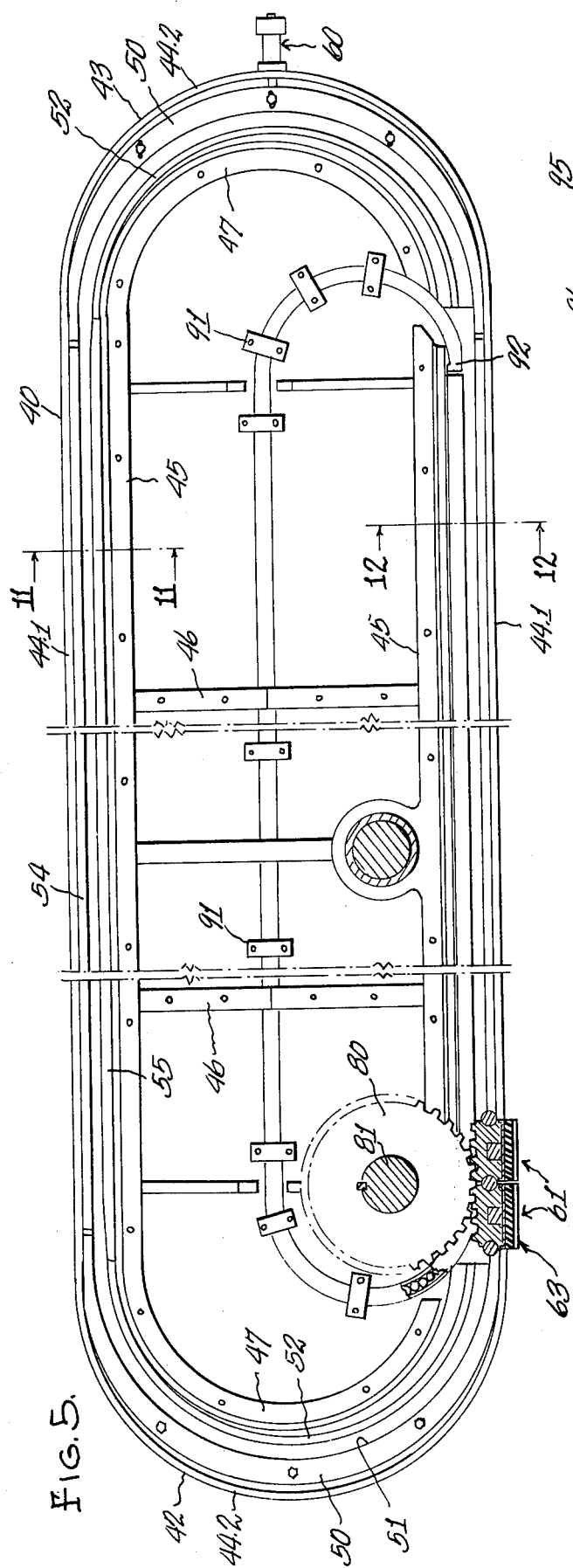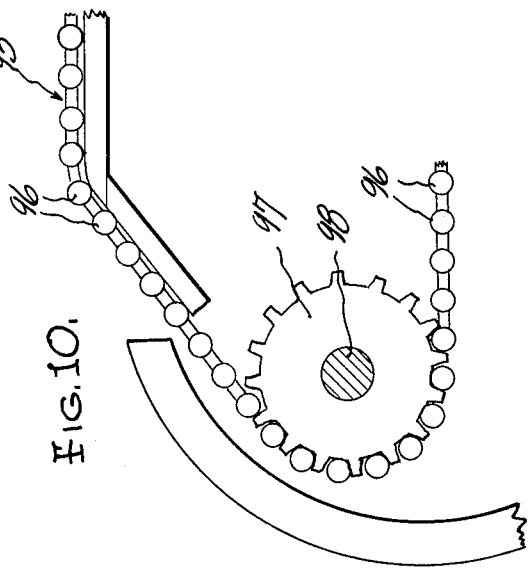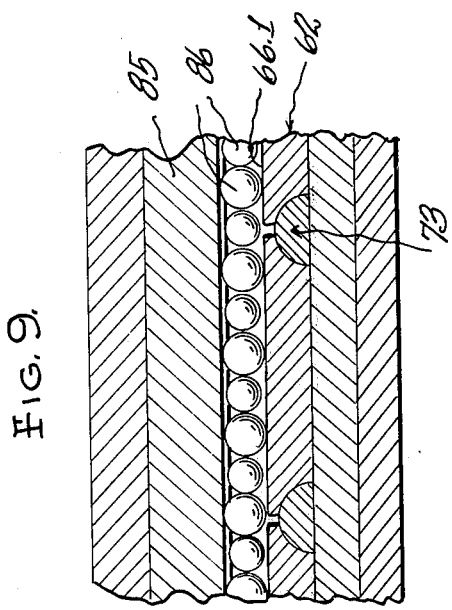

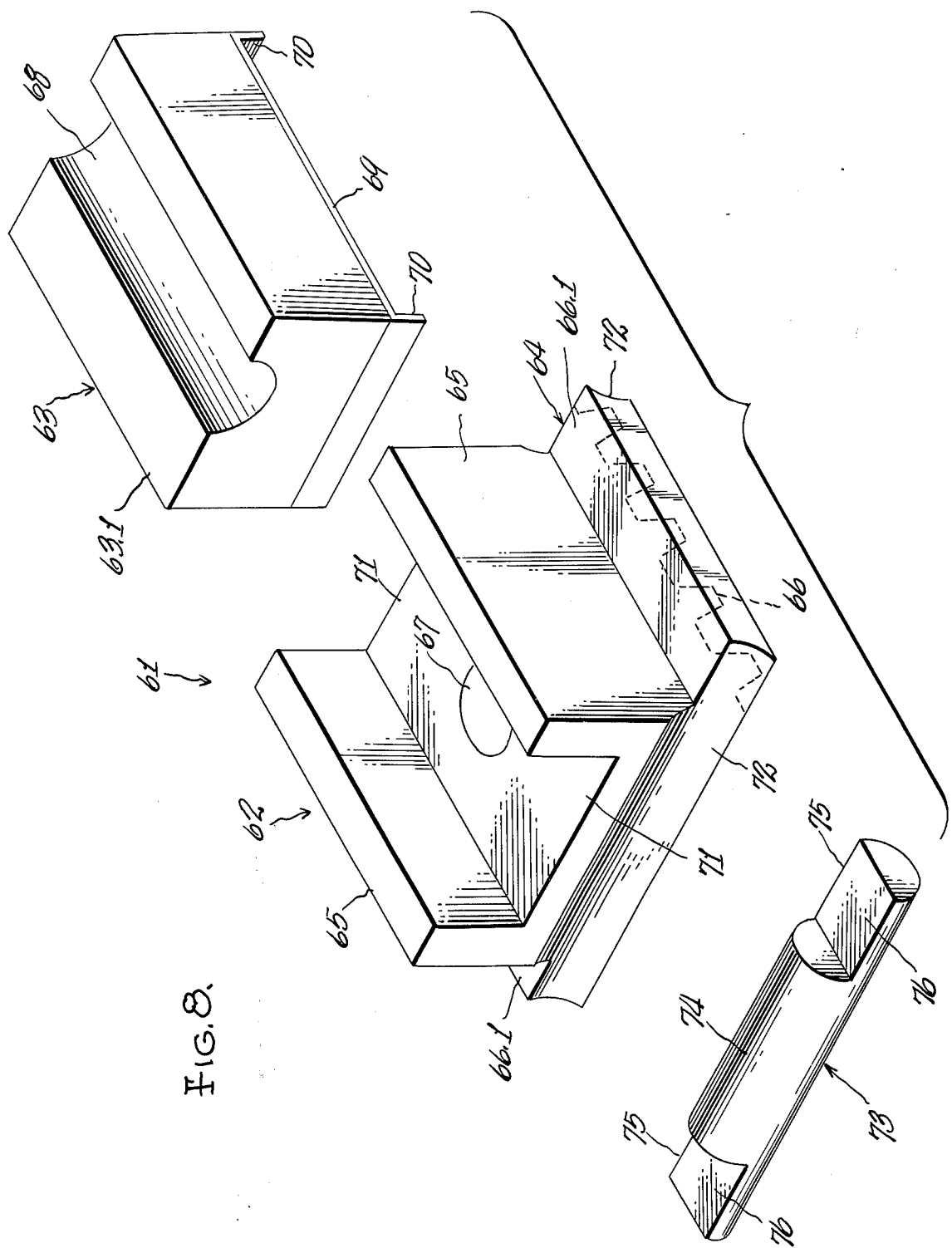

TRACTIVE APPARATUS

This is a continuation of application Ser. No. 25,418 filed Apr. 3, 1970.

BACKGROUND AND SUMMARY

Tractive apparatus for longitudinally moving elongated material and of the type providing opposed tractive assemblies which grip the interposed material between material gripping bodies circulating in a closed path have long been known. An example of such apparatus is disclosed in Von Eldik U.S. Pat. No. 3,103,306. In prior art apparatus, of which I am aware, each individual material gripping body, or tractive member, was secured to and was part of a link chain trained over sprockets. In such prior apparatus, tractive member movement was effected by application of a driving force to one of the sprockets to thus pull the chains and the attached tractive members against the resistance offered by the gripped material.

Despite the highly efficient material gripping force available in apparatus of the type herein concerned, such prior art devices have not been widely used for the following reasons: First, sprocket drive under heavy loadings at high speed has not been smooth, and second, and most important, chains are formed of many relatively small parts subjected to very heavy stresses when loads and speeds are high. This has resulted in nearly prohibitive maintenance problems in many applications where the apparatus would otherwise be suitable.

The present invention, by confining the tractive members to circulation in a closed path in end-to-end relation and with such members substantially completely filling such path, avoids the previous necessity of interconnecting the members to form a chain. Since the tractive members need not be interconnected, many small, highly stressed and rapidly wearing parts are eliminated to thus provide for long, trouble-free operation.

To effect movement of a group of tractive members through their travel path, a drive pinion is engaged with teeth formed on each tractive member and, since the tractive members are so related to each other that they resist only compressive rather than tensile forces, such tractive members are held in abutting relation about their path by the drive pinion.

These and other advantages will readily become apparent from a study of the following and from the drawings appended hereto, and it is a primary object of this invention to provide new and improved tractive apparatus of the character disclosed.

DESCRIPTION OF THE DRAWINGS

In the drawings accompanying this description and forming a part of this specification, there is shown, for purposes of illustration, an embodiment which my invention may assume, and in these drawings:

FIG. 1 is a broken top plan elevational view of apparatus embodying the present invention, FIG. 2 is a broken side elevational view of the apparatus, FIG. 3 is an end elevational view of the apparatus, FIG. 4 is a broken elevational view of certain parts shown in FIG.3, FIG. 5 is a broken enlarged sectional view corresponding generally to the line 5—5 of FIG. 3, FIG. 8 is a separated perspective view of parts forming part of the assembly, FIG. 9 is a fragmentary, sectional view, corresponding generally to the line 9—9 of FIG. 7, FIG. 10 is a fragmentary view showing a slightly alternate form of a detail, FIGS. 11 and 12 are fragmentary sectional views respectively corresponding generally to the lines 11—11 and 12—12 of FIG. 5, the tube gripping members being shown in elevation, and FIG. 13 is an enlarged fragmentary sectional view of a detail.

DESCRIPTION OF PREFERRED EMBODIMENT

Figure 6:
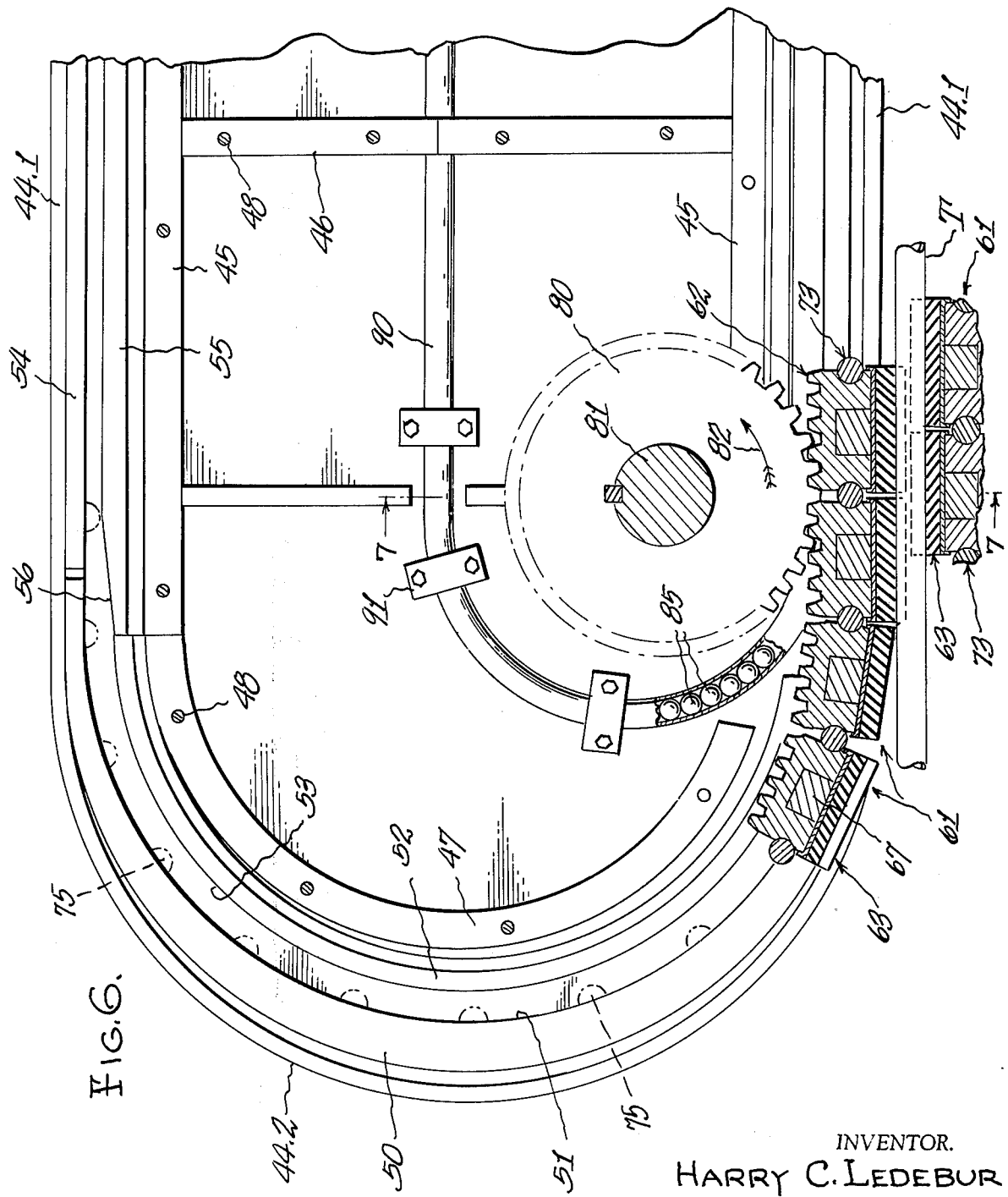
FIG. 6 is an enlarged, fragmentary sectional view of the left hand portion of the apparatus shown in FIG. 5.

A base structure 10 is provided to support the apparatus to be described, this base being formed of fabrications which are welded and/or bolted together in customary manner. Referring particularly to FIG. 1, the base structure supports a drive motor 11 and a speed reducer 14 having a pair of take-off shafts 15 and 16, both being driven at the same speed but in opposite directions.

The base structure 10 provides a pair of vertically spaced bearings 17, 18 (see FIG. 3) in which shafts 19 and 20 are journalled for rotation. Fixed to one end of the shafts are crank arms 19.1, 20.1 and fixed to the opposite end of the shafts are crank arms 19.2, 20.2, the latter arms being journalled in bearings carried by a pair of tractive assemblies 21, 22 which are identical in construction but are oppositely disposed so that facing edges are in operative relation.

Extending between the crank arms 19.1, 20.1 is a fluid cylinder 23, with its piston rod 24 (see FIG. 4) pivotally connected at 25 to the free end of the arm 19.1 and its blank end connected at 26 to the free end of the arm 20.1. Each of the tractive assemblies 21, 22 comprises a horizontally elongated body, as best seen in FIG. 2, and each is movable toward and away from the pass line 27 of the tubing T to be propelled by apparatus hereinafter to be disclosed.

The base structure 10 also supports a horizontally disposed beam 28 which is C-shaped in cross-section and which has its longitudinal axis centered on the pass line 27. Springs 29, 29 are disposed between the beam 28, and brackets 19.3 and 20.3, at longitudinally spaced places to normally urge the tractive assemblies 21, 22 apart as shown in FIGS. 2 and 3, and to maintain them approximately parallel to the pass line as they are opened and closed. The base structure 10 has spaced lugs 129 (only one being visible in FIG. 3) through which bolts 30 are threaded, the upper end of the bolts bearing against respective brackets 31 fixed to the lower tractive assembly 22 to adjustably limit downward movement of the assembly. The upper tractive assembly 21 has spaced lugs 32 (see FIG. 1) through which bolts 33 are threaded, the lower end of the bolts being adapted to bear against the upper surface of the beam 28 when the assemblies 21 and 22 are closed on the tube T to maintain the tube gripping portion of the upper assembly in fixed relation with the pass line 27.

In FIG. 4, the piston rod 24 of the cylinder 23 is in extended relation whereby the arms 19.2, 20.2 are swung apart their greatest distance, thereby holding the tractive assemblies 21, 22 separated to provide for the threading of a tube into the apparatus. The piston rod 24 is retracted when fluid under pressure is admitted to the rod end of the cylinder and fluid is withdrawn from the blank end, to simultaneously shift the rod connection 25 and the blank connection 26 toward each other in equal amounts, as suggested by the phantom lines in FIG. 4. This causes the upper tractive assembly 21 to move downward until the lower end of the bolts 33 hear against the upper surface of the beam 28, and causes the lower tractive assembly to move upward to operative relation with the upper tractive assembly, and the assemblies are held in such position by the force exerted by the piston 23.

A tube threading device 35 (FIG. 1) is provided for threading the leading end of the tube into the pass line between the tractive assemblies 21, 22, and such device comprises a tube gripping clamp 36 which may be of any suitable construction. The clamp 36 comprises jaw parts (not shown) which are movable together to grip the tube therebetween, and such parts are carried by a slide 37 which is slidable along the beam 28. A fluid cylinder 38 has its piston rod 39 connected to the slide 37 and its blank end supported by a standard 40. When fluid under pressure is admitted to the blank end of the cylinder 38, the slide will be driven to the left, as viewed in FIG. 2, in position wherein its clamp 36 may engage a tube entering from the left. Pressure fluid is then admitted to the rod end of the cylinder 38 and the gripped tube is pulled through the apparatus until the clamp 36 reaches the position shown in FIG. 2, whereupon the clamp 36 is disengaged from the tube and the tractive assemblies are closed upon the tube.

Figure 7:
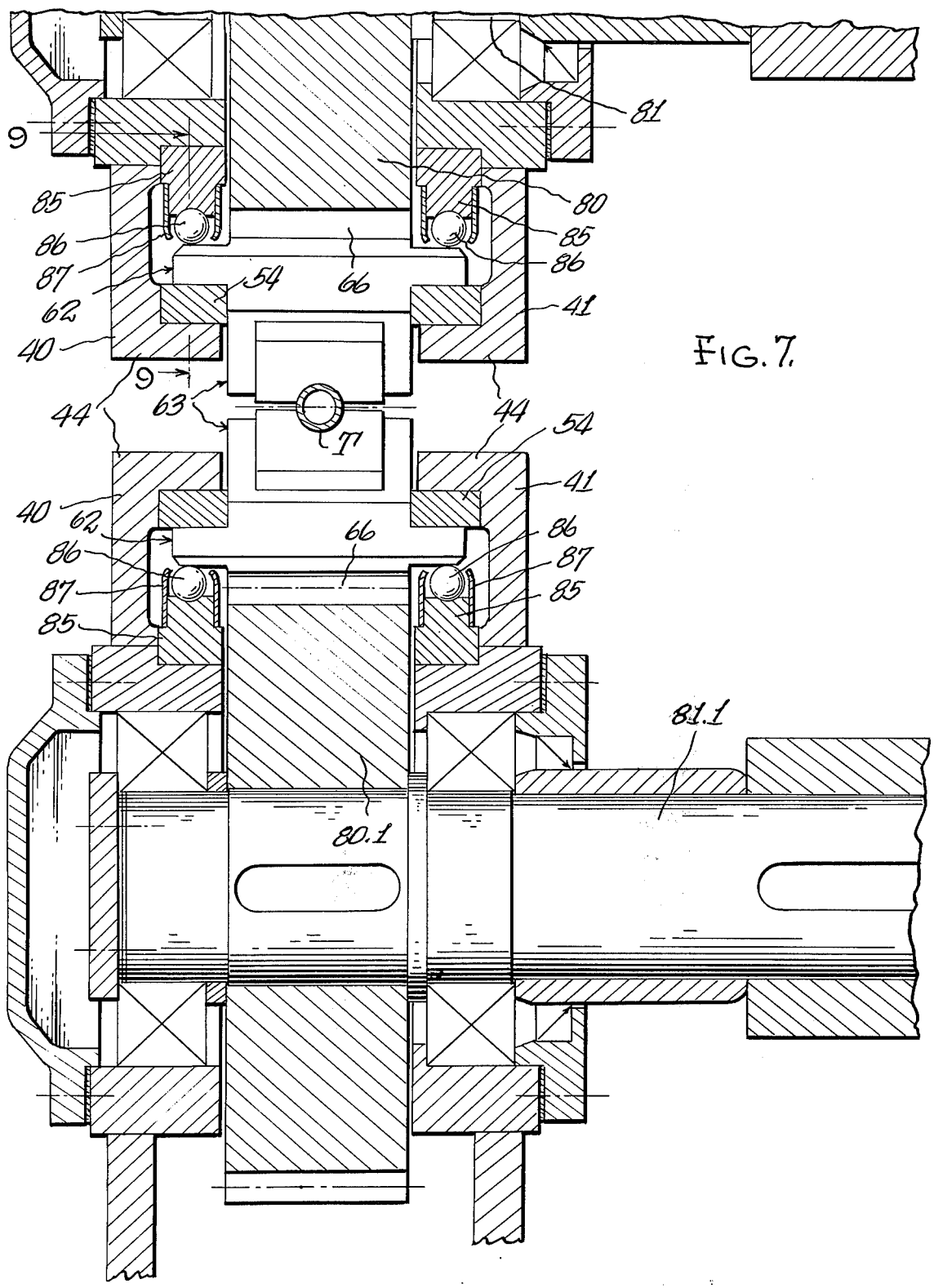
FIG. 7 is an enlarged, broken sectional view, corresponding generally to the line 7—7 of FIG. 6, the tube gripping members being shown in elevation.

As before stated, the tractive assemblies 21, 22 are identical, but are oppositely disposed to have their cooperating parts in facing relation, as shown in FIGS. 6 and 7. Each tractive assembly is formed of a pair of side plates 40, 41. Each side plate provides an inturned lip 44 which has rectilinear portions 44.1 along opposite edges of the side plate and semi-circular portions 44.2 at the ends 42, 43.

Fixed inwardly of each side plate are longitudinal ribs 45 and cross-ribs 46, and fixed inwardly of each end are arcuate ribs 47, the ribs of one side plate 40 and ends abutting corresponding ribs of the opposite side plate 41 and ends, to maintain a fixed spacing between such plates, and bolts 48 are passed through openings in such ribs to hold the cooperating side plates and ends in side to side position.

An arcuate track section 50 is secured inwardly of each end 42, 43, as shown in FIGS. 5 and 6, and provides an arcuate track surface 51. A further arcuate track section 52 is also secured inwardly of each end 42, 43 and provides a track surface 53 which is in facing and cooperating relation with the track surface 51, the track surface 53 being useful during assembly of the apparatus to hold the tube gripping members 61 (later to be described) in relative position. Each side plate has a rectilinear track section 54, such as a bronze wear plate, forming a continuation of the ends of the arcuate track sections 50 and a bronze wear plate 55 forming a continuation of the ends of the arcuate track section 52, the opposite ends of the wear strip being inclined, as seen at 56, for a purpose to appear.

In order to provide for adjustment of the total length of the track formed by the track section 50, and wear strips 54 and 55, one or both ends of the track may be adjustable. In the disclosed embodiment, the track sections 50 at the right end (FIG. 5) are mounted to the ends 43 for movement toward and away the ends of the track sections 54 and wear strips 55. This may be accomplished by elongating bolt holes which receive holding bolts 148, and a pressure applying member 60 (see FIG. 13) may be carried by each of the lips 44.2 on the ends 43, to constantly exert a pressure on the track section in an inward direction. The pressure applying member 60 comprises a tube 60.1 having a reduced end 60.2 threaded into a pad 60.3 which is welded to a lip 44.2, and also into a threaded hole in the lip. A rod 60.4 extends longitudinally through the tube and is pressed to the left by a spring 60.5 which is compressed between a head 60.6 (held to the rod by a snap ring 60.7) and a cap 60.9. which is threaded on the open end of the tube. A set screw 60.8 holds the cap in adjusted position on the tube. The holding bolts 148 will be threaded on amount to hold the track 50 in position, and yet permit sliding of the track in the amount limited by the elongated holes through which the bolts pass.

A plurality of identical tractive or tube gripping members 61 (see expecially FIGS. 6 and 8) are adapted to move along the tracks mentioned above, each member comprising a block portion 62 and a gripper portion 63. Each block portion comprises a flat body 64 with spaced side members 65 extending from one side surface, and gear teeth 66 extending from an opposite surface. The spacing of the side members and the length of the gear teeth are such that flat sided projections 66.1, 66.1 extend therebeyond. The body 64 of each block portion 62 is formed with an opening in which a permanent magnet 67 is fixed.

The gripper portion 63 comprises a block 63.1 of material which has tube gripping properties and which will withstand wear. In the disclosed embodiment, the block is made of urethane, although other suitable material, such as metal or rubber, may be used. The block has a longitudinal groove 68 therein, the groove in cross-section being slightly less than semi-circular so that opposed blocks will grip the tube without interference with each other. A thin metal plate 69 is bonded to that surface of the block which is opposite the groove, the plate having depending ends 70, 70 which closely fit over edges 71, 71 of the block portion 62, to hold the gripper block against lateral movement in one direction. The gripper block 63 closely fits between the side members 65 so as to be held against movement in another direction. The magnet 67 holds the gripper portion assembled with the block portion.

Opposite ends of the block portion have arcuate surface 72, 72 to closely fit cylindrical portions of rods 73 which are interposed between adjoining gripping members 61. As best seen in FIG. 8, the rods are fully cylindrical at an intermediate portion 74 and are semi-cylindrical at the end portions 75. The surface 76 of each end portion is ground complementary to the arcuate shape of the track surfaces 51 for a purpose to appear.

The gripping members 61 are of a chosen number so that they completely fill the rectilinear and semi-circular portions of the tracks of each tractive assembly 21, 22, and their length (from edge 71 to edge 71, FIG. 8) is carefully chosen so that their combined lengths, plus the spacing of the rods 73 maintain the blocks 62 and intervening rods 73 in substantially abutting relationship. The teeth 66 on the blocks are also carefully formed so that the teeth on a driving gear 80 will mesh with the teeth on successive blocks, as best seen in FIG. 6.

Referring to FIG. 7, driving gears 80, 80.1 are keyed to shafts 81, 81.1 which are supported in bearings in the respective side plates 40, 41, each of the shafts being driven at the same speed, but in opposite directions, by universal-jointed connection with respective take-off shafts 15, 16 of the speed reducer 14. The upper shaft 81, in the illustrated embodiment, is driven in the direction of the arrow 82 (FIG. 6) and therefore the lower shaft 81.1 is driven in the opposite rotation. As seen in FIG. 6, the upper gear 80 meshes with the teeth of blocks 62, which are adjacent thereto and pushes such blocks and the preceding ones to the right. In view of the abutting relationship between blocks 62 and interposed rods 73, the gripping members 61 will be recirculated along the closed track formed by the rectilinear and semi-circular track sections, the ground surfaces 76 of the rods 73 having bearing contact with the arcuate track surfaces 51, and the gripping members 61 are arranged in their respective tracks so that they are in opposed relationship, as suggested in FIG. 6.

In order that opposed gripping members are maintained in exact laterally spaced relationship as they move along the pass line, hardened steel rails 85, 85 (see FIGS. 7 and 9) are fixed to and inwardly of each of the side plates 40, 41 of each tractive assembly 21, 22 paralleled to but spaced from the pass line. Each rail 85 has a slight longitudinal groove in a face thereof to provide a track along with a plurality of hardened steel balls 86 roll. Retainer plates 87, 87 may be secured to opposite sides of each rail 85 to insure against displacement of the balls.

As seen in FIGS. 7 and 9, the balls 86 are interposed between the rails 85 and the flat side surfaces 66.1 (on the same side as the gear teeth 66) to oppose any deflection, which might be caused when the oppositely disposed gripper portions 61 grip the tube T, to thereby maintain a tight gripping engagement on the tube and thereby prevent slippage, and to minimize frictional resistance to the driving of the gripping members 61 along the track. As seen in FIGS. 5 and 6, the balls 85 outside of the pass line, are contained within metal tubes 90 which are secured to respective sides and ends, as shown at 91. Each tube terminates adjacent to the pass line, as seen at 92, in FIG. 5. The balls 85 fill each tube and are in abutting relationship, and the ends of the tubes may be ground, if nexessary, to exact size to take any clearance out of the balls. As the opposed pairs of tube gripping members 61 are driven through the pass line, the balls will roll along the rails 85 and thus recirculate through the tubes 90.

Preferably alternate balls 85 are of slightly smaller diameter, as shown in FIG. 9, so as not to be subjected to compressive forces. Therefore, high compressive forces may be utilized to grip the tube, without any tendency of the balls to bind against rotation. Instead of the balls 85, a roller chain 95 (see FIG. 10) may be utilized, the chain providing hardened steel rollers 96 which function in place of the balls. In this case, the chain may be trained over spaced sprockets 97 (only one shown in FIG. 10) which are journalled on shafts 98.

In operation, the tractive assemblies 21, 22 are initially held in the separated relationship shown in FIGS. 2 and 3, by the fluid cylinder 23, so that the tube threading device 35 may be moved to the left (with respect to FIG. 1). The leading end of the tube T is gripped by the clamp 36 and is drawn to the right and through the pass. The clamp 36 is then released from the tube and the fluid cylinder 23 actuated to close the tractive assemblies 21, 22 onto the tube. Since the shafts (to which the crank arms 19.1, 20.1 are connected) are disposed substantially at the longitudinal center of a respective tractive assembly, an equalizer effect is produced to insure that the gripping members 61 of the lower tractive device may be held to the pass line, it being remembered that the upper tractive assembly is held in exact relation with the pass line by the bolts 33.

The motor 14 is now started to drive the speed reducer 14 and thereby drive both driving gears 80, 80.1. Rotation of the gears will push the opposed pairs of gripping members 61 along the pass line or working portion of the path, these members at this time being closely held in tube gripping relation by reason of the action of the balls 85 (or the rollers 96 of the roller chains 95). As the gripping members 61 leave the pass, the ground surfaces 76, 76 of the rods 73 bear against the track surface 51 on the right hand semi-circular end (with respect to FIG. 5) and then enter the rectilinear track portion (opposed to the pass) and move to the left (with respect to FIG. 5). As the gripping members 61 move through this rectilinear track portion, the surfaces of the flat side surfaces 66.1 (on the same side as the teeth 66) are supported by and slide along the wear plate 55, and the surfaces of the flat-sided projections 66.1 (on the opposite side of the teeth) are supported by and slide along the wear plates 54.

On leaving the left hand end (with respect to FIG. 5) of the rectilinear track portion, the ground surfaces 76 of the rods 73 engage against the track surface 51 of the left hand semi-circular end plate 42 to guide the gripping members to the pass line.

I claim:

1. A tractive device for gripping elongated stock and for exerting a force thereon longitudinally thereof, the improvement comprising:
    a plurality of tractive members circulating in a closed path toward and away from successive engagement with said stock,
    and means removably secured to each member by magnetic attraction and providing a replaceable stock-engaging face.

2. A tractive device for gripping elongated stock and for exerting a force thereon longitudinally thereof, the improvement comprising:
    a plurality of tractive members circulating in a closed path toward and away from successive engagement with said stock,
    and means removably secured to each member providing a replaceable stock-engaging face, each of said means comprising a non-magnetically permeable, stock-gripping body affixed to a magnetically permeable backup,
    each member mounting a magnet positioned to attract and retain a respective backup aforesaid to a respective member.

3. In a tractive device for gripping elongated stock and for exerting a force thereon longitudinally thereof and including two sets of tractive members circulating in respective closed paths, portions of which are in opposed adjoining relation to provide a pass through which the stock travels, the improvement comprising:
    a plurality of rolling bodies arranged in two sets each circulating in respective closed paths within respective member paths and portions of said rolling body paths paralleling respective member path portions aforesaid, said rolling bodies bearing against said tractive members when the latter are at respective path portions aforesaid to retain said members in gripping relation with the stock while minimizing frictional resistance to tractive member movement, said rolling bodies in each set comprising rollers on a respective roller chain.

4. A tractive device for forcing elongated work, such as a bar, tube and the like, in a longitudinal manner, comprising:

track means forming a guide surface along a closed path, a portion of which is arcuate and another portion of which is rectilinear and defines a working station wherein force is applied to said work to move it longitudinally, a plurality of rigid gripping members movable along said path and adapted to grip said work in travel along said retilinear path portion and thus move said work longitudinally, said gripping members being disposed in end-to-end relation in said path, a plurality of separate, rigid intermediate members, each interposed between facing ends of adjoining gripping members, and having only abutment interengagement therewith, said gripping members and said intermediate members completely filling said path to substantially maintain facing ends of all adjoining gripping members in abutment with respective intermediate members, the latter providing for longitudinal angular displacement of adjoining gripping members as they move through said arcuate path portion, while providing for solid transmission of force from one gripping member to an adjoining gripping member as such members move along said rectilinear path portion, and means for forcing said gripping members along said path.

5. The construction according to claim 4, wherein said intermediate members are rod-like, and each disposed with its longitudinal axis normal to the path of movement of said gripping members.

6. The construction according to claim 5, wherein facing ends of adjoining gripping members extend normal to the path of movement of the latter, each facing end having a convexly curved surface, and wherein each of said rod-like intermediate members has a cylindrical portion, opposed parts of which fit within said curved surfaces.

7. The construction according to claim 6, wherein an end portion of each intermediate member has sliding engagement with said guide surface.

8. The construction according to claim 4, wherein each of said gripping members has a toothed portion directed inwardly of said closed path, and a gear rotatably mounted within the confines of said closed path and meshing with the teeth of said gripping members as the latter enter said rectilinear path portion, and means for driving said gear.

9. The construction according to claim 4, and further including backing means disposed along said rectilinear path portion and forming a rigid rectilinear backing against which said gripping members bear to restrict movement of the latter transversely away from said work.

10. The construction according to claim 9, wherein said backing means comprises a plurality of circular anti-friction members held to movement within a closed path.

11. The construction according to claim 7, wherein the closed path for said circular anti-friction members is smaller than the path for said gripping members and is disposed therewithin.

12. A tractive device for forcing elongated work, such as a bar, tube and the like, in a longitudinal manner, comprising:

a pair of laterally spaced side plates, a track on the inside surface of one side plate, forming a guide surface along a closed path, a portion of which is arcuate and another portion of which is rectilinear and defines a working station wherein force is applied to said work to move it longitudinally, a plurality of rigid gripping members, each extending crosswise of the space between said plates, and movable along said path and adapted to grip said work in travel along said rectilinear portion and thus move said work longitudinally, said gripping members being disposed in end-to-end relation in said path, a plurality of rigid intermediate members, each extending crosswise of the space between said plates and interposed between facing ends of adjoining gripping members, each intermediate member having a central portion having abutment interengagement with respective facing ends, and an end portion slidable along said guide surface to guide movement of said gripping members along said path, said gripping members and said intermediate members completely filling said path to substantially maintain facing ends of all adjoining gripping members in abutment with the central portion of respective intermediate members, the latter providing for angular displacement of adjoining gripping members as they move through said arcuate track portion, while providing for solid transmission of force from one gripping member to the next as they move along said rectilinear track portion, and means for forcing said gripping members along said path.

13. The construction according to claim 12, and further including a pair of tracks, each on the inside surface of a respective side plate, forming a pair of matching guide surfaces along identical closed paths, opposite end portions of each intermediate member being slidable along respective guide surfaces.

14. The construction according to claim 12, wherein each of said gripping members has gear teeth extending inward of said closed path, and a driven gear journalled between said side plates and disposed within the confines of said closed path, the teeth on said gear meshing with the teeth on those gripping members entering said rectilinear path portion.

15. The construction according to claim 12, and further including a plurality of hardened steel circular members movable in a closed path which is smaller than the closed path for said gripping members, a portion of the smaller closed path comprising a rectilinear hardened steel rail carried by a side plate and disposed in juxtaposed relation with respect to the rectilinear portion of the larger closed path, said circular members being interposed between said rail and said gripping members as the latter move along the rectilinear portion of said larger closed path and providing a rigid backup for said gripping members.

16. The construction according to claim 12, and further including a base, said side plates being connected to each other, and a pivotal connection between a side plate and said base to permit said side plates to rock in edgewise manner.

17. The construction according to claim 12, and further including a second set of spaced side plates similar to the first named side plates and having a guide surface forming a closed path, gripping members and intermediate members of the character specified in connection with said first named side plates, said first named and second sets of side plates being held in edge-to-edge aligned relation wherein the rectilinear portion of one path is in juxtaposed relation with the rectilinear path portion of the other to form a rectilinear throat through which said work is forced.

18. The construction according to claim 17, and further including a base, a connection between each set of side plates and said base, at least one connection providing for edgewise adjustment of one set of side plates relative to the other to adjust the transverse size of said rectilinear throat.

19. The construction according to claim 17, and further including a base, a pair of spaced parallel shafts journalled in said base, one set of common ends of said shafts having a first set of crank arms respectively secured thereto, and the other set of common ends of said shafts having a second set of crank arms respectively secured thereto, the free ends of the second set of crank arms being respectively journalled in bearings carried by the side plates of respective first and second sets of side plates, and means connected to the free ends of said first set of crank arms for rotating said shafts in opposite directions.

20. The construction according to claim 19, wherein said last named means comprises a fluid cylinder having its barrel pivotally connected to the free end of one of said first set of crank arms, and its piston rod pivotally connected to the free end of the other crank arm.

* * * * *

UNITED STATES PATENT OFFICE
CERTIFICATE OF CORRECTION

PATENT NO. : 3,945,547
DATED : March 23, 1976
INVENTOR(S) : Harry C. Ledebur

It is certified that error appears in the above-identified patent and that said Letters Patent are hereby corrected as shown below:

Col. 3, line 10 - "hear" should be- - - -bear- - - - .

Col. 4, line 52 - "surface" should be - - -surfaces- - - .

Col. 6 - line 4, the comma after "tube" should be a period.

Col. 8, in the first line of claim 11, "7" should be - - - - - -10 - - - - .

Signed and Sealed this eighth Day of June 1976

[SEAL]

Attest:

RUTH C. MASON
Attesting Officer

C. MARSHALL DANN
Commissioner of Patents and Trademarks